(12) United States Patent
Khati et al.

(10) Patent No.: US 11,843,443 B1
(45) Date of Patent: Dec. 12, 2023

(54) ADAPTIVE OPERATION TO MITIGATE SPECULAR REFLECTIONS

(71) Applicant: Apple Inc., Cupertino, CA (US)

(72) Inventors: Dhruv Khati, San Jose, CA (US); Shiva Krishna Narra, San Jose, CA (US); Sudhir K. Baghel, Hillsborough, NJ (US); Sanjeevi Balasubramanian, San Jose, CA (US); Sebastian Balint Seeber, San Francisco, CA (US); Anjaneyulu Maganti, San Jose, CA (US); Jeremiah Hsu, Los Gatos, CA (US); Venkateswara Rao Manepalli, San Jose, CA (US)

(73) Assignee: Apple Inc., Cupertino, CA (US)

( * ) Notice: Subject to any disclaimer, the term of this patent is extended or adjusted under 35 U.S.C. 154(b) by 401 days.

(21) Appl. No.: 17/235,855

(22) Filed: Apr. 20, 2021

(51) Int. Cl.
  *H04B 7/08* (2006.01)
  *G01S 19/22* (2010.01)
  *G01S 19/42* (2010.01)

(52) U.S. Cl.
  CPC ............ *H04B 7/0894* (2013.01); *G01S 19/22* (2013.01); *G01S 19/428* (2013.01)

(58) Field of Classification Search
  CPC ...... H04B 7/0894; G01S 19/22; G01S 19/428
  See application file for complete search history.

(56) References Cited

U.S. PATENT DOCUMENTS

| | | | |
|---|---|---|---|
| 2006/0135079 A1* | 6/2006 | Barnett | H04B 7/0691 455/69 |
| 2010/0315289 A1* | 12/2010 | Nurmela | H04B 17/364 342/385 |
| 2021/0132236 A1* | 5/2021 | Cookman | G01S 19/24 |

* cited by examiner

*Primary Examiner* — Nguyen T Vo
(74) *Attorney, Agent, or Firm* — DICKINSON WRIGHT RLLP

(57) ABSTRACT

Methods, devices, and apparatus to adapt operating parameters for satellite signal reception and transmission by a wireless device to mitigate effects of fading due to specular reflections are described herein. The wireless device measures received signal power levels and compares characteristics of the measurements over an observation duration to at least one fading criteria to determine whether to operate in a normal or adaptive mode. While operating in the adaptive mode, the wireless device alternates between high performance mode time periods and low performance mode time periods. The wireless device indicates to a ground station associated with the satellite in which operating mode the wireless device is operating via an uplink data message transmitted during a data cycle at the start of a high or low performance mode time period. The ground station schedules data transmissions accordingly during subsequent data cycles of the high or low performance mode time periods.

20 Claims, 11 Drawing Sheets

700

| Adaptive Mode | Adaptive Properties (Multiple Options) |
|---|---|
| High Performance Cycle | Normal Data TX/RX Scheduling<br>High Dynamic TX/RX<br>Higher Modulation TX/RX<br>Normal Power Consumption<br>Higher Priority Data TX/RX<br>Higher QoS Data TX/RX |
| Low Performance Cycle | No Data TX/RX Scheduling<br>Low Dynamic TX/RX<br>Lower Modulation TX/RX<br>Reduced Power Consumption<br>Lower Priority Data TX/RX<br>Lower QoS Data TX/RX |

*FIG. 7*

ADAPTIVE OPERATION TO MITIGATE SPECULAR REFLECTIONS

FIELD

The described embodiments relate generally to wireless communication, including methods and apparatus to adapt operation of a wireless device to mitigate specular reflections. A wireless device measures one or more fading properties of a received signal that includes a direct path component and an indirect specular reflected path component. Based on a comparison of the one or more fading properties of the received signal to at least one fading criteria, the wireless device operates in a normal mode or in an adaptive mode that includes alternating high performance time periods and low performance time periods.

BACKGROUND

Recent technological advances have integrated various wireless radio access technologies (RATs) into single, multi-functional wireless devices. Specialized single-function wireless devices are being replaced and/or supplemented by multi-functional wireless devices that can communicate using the various RATs. Wireless devices that transmit and receive signals via earth orbiting satellites can be used for communication in areas with sparse or negligible cellular wireless coverage. Integrating satellite communication technology into multi-functional wireless devices can increase their usefulness when traveling to remote areas that lack cellular wireless service. Field measurements of power levels for satellite signals received at a wireless device show large ripples caused by constructive and destructive combining of a direct path and specular reflected indirect path signal components resulting in multi-path interference. Mitigating the effects of the specular reflection generated, multi-path interference can improve system performance for the wireless device.

SUMMARY

The described embodiments relate generally to wireless communication, including methods and apparatus to adapt operation of a wireless device to mitigate specular reflections. A wireless device measures one or more fading properties of a received signal that includes a direct path component and an indirect specular reflected path component. Based on a comparison of the one or more fading properties of the received signal to at least one fading criteria, the wireless device operates in a normal mode or in an adaptive mode that includes alternating higher performance time periods and lower performance time periods.

Methods, devices, and apparatus to adapt operating parameters for satellite signal reception and transmission by a wireless device to mitigate the effects of fading due to specular reflection generated multi-path interference are described herein. Satellite communication signals received at the wireless device in the downlink direction and at the satellite in the uplink direction exhibit ripples in measured power levels caused by constructive and destructive multi-path interference due to specular reflections. The multi-path interference varies with the elevation angle of the satellite, the carrier frequency (and resulting wavelength), the reflectivity of the surrounding surface, the transit time of the satellite, and a position (e.g., height and orientation) of the wireless device and of one or more antennas included therein relative to the surrounding surface. The wireless device can include a specular reflection multi-path interference algorithmic model to predict received signal power level variations. The wireless device can measure received signal power levels and compare one or more characteristics of the received signal power over an observation duration time interval to at least one fading criteria. Representative characteristics include i) a measured and/or predicted time period between successive fades, also referred to as a signal fade periodicity, e.g., a time between successive peak levels, and ii) a signal fade level, e.g., a difference between a peak level and a lowest level for a fade. The mobile device can compare the one or more measured signal characteristics obtained during the observation duration time interval to the at least one fading criteria to determine whether to operate in a normal mode or in an adaptive mode. While operating in the adaptive mode, the wireless device can alternate between high performance time periods and low performance time periods. In some embodiments, high and low performance time periods are determined based on predicted and/or measured receive signal levels compared to a receive signal threshold. While in the adaptive mode, the wireless device indicates to a ground station associated with the satellite in which operating mode (high performance or low performance) the wireless device seeks to operate via an uplink data message transmitted during a data cycle at the start of a high or low performance time period. The ground station can schedule downlink data transmissions (satellite to wireless device) and uplink data transmissions (wireless device to satellite) accordingly during subsequent data cycles of the high performance or low performance time periods. In some embodiments, the ground station schedules data transmission and reception during higher performance time period data cycles to allow for higher performance operation at the wireless device, e.g., i) normal (not restricted) data scheduling, ii) high dynamic transmit/receive (DRX) operation, iii) higher modulation constellations, iv) higher priority data transmissions, and/or v) higher quality of service (QoS) data transmissions. In some embodiments, the ground station schedules data transmission and reception during lower performance time period data cycles to allow for lower performance operation at the wireless device, e.g., ii) limited (restricted) or no data scheduling, ii) low DRX operation, iii) lower modulation constellations, iv) lower priority data transmissions, and/or v) lower QoS data transmissions. In some embodiments, the wireless device operates in a normal power consumption mode during the high performance time period and in a reduced power consumption mode during the low performance time period.

Other aspects and advantages of the present disclosure will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIG. 7 illustrates a table of exemplary adaptive properties for satellite data transmission to a wireless device during high and low performance cycles of an adaptive mode, in accordance with some embodiments.

DETAILED DESCRIPTION

Figure 1:
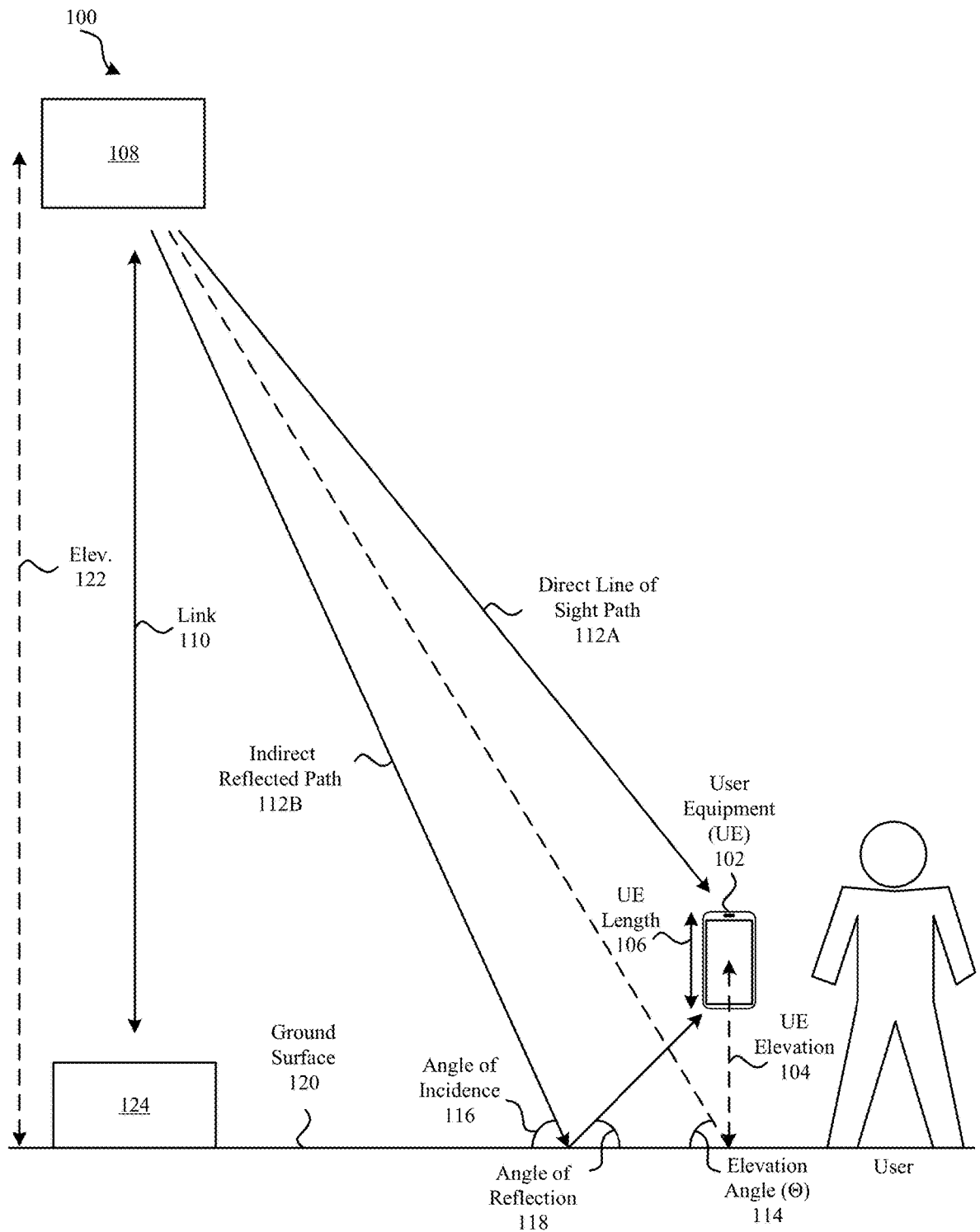
FIG. 1 illustrates an exemplary satellite communication system, in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The described embodiments relate generally to wireless communication, including methods and apparatus to adapt operation of a wireless device to mitigate specular reflections. A wireless device measures one or more fading properties of a received signal that includes a direct path component and an indirect specular reflected path component. Based on a comparison of the fading properties of the received signal to at least one fading criteria, the wireless device operates in a normal mode or in an adaptive mode that includes alternating high performance time periods and low performance time periods.

Methods, devices, and apparatus to adapt operating parameters for satellite signal reception and transmission by a wireless device to mitigate the effects of fading due to specular reflection generated multi-path interference are described herein. Satellite communication signals received at both the wireless device and at the satellite can exhibit ripples in measured power levels caused by constructive and destructive combining of a direct path component and an indirect path component caused by specular reflection from a surrounding surface in the vicinity of the wireless device. The wireless device receives both a direct line-of-sight signal from the satellite and an indirect time-delayed version of the signal reflected from the surrounding surface resulting in multi-path interference. The multi-path interference varies with the elevation angle of the satellite, the carrier frequency (and resulting wavelength), the reflectivity of the surrounding surface, the overhead transit time of the satellite, and a position (e.g., height and orientation) of the wireless device and of one or more antennas included therein relative to the surrounding surface. Specular reflections can occur on both the forward downlink path from the satellite to the wireless device and on the reverse uplink path from the wireless device to the satellite. The wireless device can include a specular reflection multi-path interference algorithmic model to predict received signal power level variations. The wireless device can measure received signal power levels and compare one or more characteristics of the received signal power over an observation duration time interval to at least one fading criteria. Representative characteristics of the received signal power can include i) a measured and/or a predicted time period between successive fades, also referred to as a signal fade periodicity, e.g., a time between successive peak levels, and ii) a signal fade level, e.g., a difference between a peak level and a lowest level for a fade. The mobile device can compare the measured signal characteristics obtained during the observation duration time interval to the at least one fading criteria to determine whether to operate in a normal mode or in an adaptive mode.

When measured characteristics of the received signal power satisfy the at last one fading criteria over an observation duration time interval of at least a duration threshold, the wireless device can enter the adaptive mode, during which the wireless device operates during alternating time periods in a high performance mode and a low performance mode. The at least one fading criteria can be satisfied, for example, based at least in part on a comparison of i) the signal fade periodicity to a periodicity threshold, and/or ii) the signal fade level to a fade threshold. When multiple consecutive signal fade levels are sufficiently large (e.g., equal and/or exceeding the fade threshold) and/or signal periodicity occurs sufficiently rapidly (e.g., at or below the periodicity threshold) for at least an observation duration of sufficient length (e.g., equal or exceeding the duration threshold), the wireless device can enter the adaptive mode. When the at least one fading criteria is not satisfied, the wireless device can exit the adaptive mode and return to a normal mode. In some embodiments, multiple fading criteria must be satisfied for at least a continuous observation time period equal or exceeding the duration threshold to enter the adaptive mode. In some embodiments, multiple fading criteria must be not satisfied for at least a continuous observation time period equal or exceeding the duration threshold (or a second duration threshold) to exit the adaptive mode and return to the normal mode.

While operating in the adaptive mode, the wireless device alternates between high performance time periods and low performance time periods. In some embodiments, the wireless device determines when to operate in a high performance time period based on a predicted and/or a measured receive signal level compared to a receive signal threshold, e.g., use a high performance mode when measured/predicted receive signal levels equal or exceed the receive signal threshold, and use a low performance mode otherwise. In some embodiments, the wireless device determines when to operate in a low performance time period based on the predicted and/or the measured receive signal level compared to the receive signal threshold, e.g., use the low performance mode when measured/predicted receive signal levels fall below the receive signal threshold, and use the high performance mode otherwise. As discussed further herein, received signal power levels oscillate due to multi-path interference in a regular, predictable pattern of higher and lower signal power levels. Each high performance time period and low performance mode time period can include multiple consecutive data cycles for communication between the satellite and the wireless device. Each data cycle begins with a broadcast interval during which the wireless device receives broadcast information from the satellite regarding whether forward downlink data will be subsequently transmitted to the wireless device from the satellite during a data burst portion of the data cycle that immediately follows the broadcast interval. During the first data cycle at the beginning of a low performance time period, while in the adaptive mode, the wireless device transmits an uplink message to the satellite to indicate operation in the low performance mode. A controlling ground station associated with the satellite can schedule data for the wireless device accordingly during subsequent data cycles of the low performance time period. Similarly, during the first data cycle at the beginning of a high performance time period, while in the adaptive mode, the wireless device transmits an uplink message to the satellite to indicate operation in the high performance mode. The controlling ground station associated with the satellite can schedule data accordingly during subsequent data cycles of the high performance time period.

Transmissions to (and/or from) the wireless device during one or more data cycles, while the wireless device operates in the high performance mode, can use one or more adaptive properties to increase performance, e.g., i) allow normal (unrestricted) transmit and receive data scheduling for the wireless device, ii) high dynamic transmit/receive mode (e.g., allow or schedule more data cycles with transmit/receive data), iii) use higher modulations (e.g., larger signal constellations to increase data throughput), iv) schedule higher priority transmit and receive data for the wireless device (e.g., control signaling data, emergency services data, low latency voice data), v) schedule higher quality of service (QoS) data. The wireless device can also operate (or allow operation) using a normal power consumption mode while in the high performance mode. Transmissions to (and/or from) the wireless device during one or more data cycles, while the wireless device operates in the low performance mode, can use or more adaptive properties to decrease performance, e.g., i) limit (or disallow) transmit and receive data scheduling for the wireless device, ii) low dynamic transmit/receive mode (e.g., allow or schedule fewer data cycles with transmit/receive data), iii) use lower modulations (e.g., smaller signal constellations to decrease data throughput), iv) schedule lower priority transmit and receive data for the wireless device (e.g., transmission control protocol (TCP) and/or user datagram protocol (UDP) based application data, video data), v) schedule lower QoS data. The wireless device can also operate (or allow operation) using a reduced power consumption mode while in the low performance mode.

These and other embodiments are discussed below with reference to FIGS. 1-9; however, those skilled in the art will readily appreciate that the detailed description given herein with respect to these figures is for explanatory purposes only and should not be construed as limiting.

FIG. 1 illustrates a diagram 100 of a communication system including a satellite (SAT) 108 in communication with a wireless device, e.g., user equipment (UE) 102, and a ground station (GS) 124. The satellite 108 communicates bi-directionally with the ground station 124 via a GS to SAT communication link 110. The UE 102 receives downlink signals from the ground station 124 via the satellite 108 over a direct line of sight path 112A and also over an indirect path 112B reflected off of the surrounding ground surface 120. As the downlink signals received by the UE 102 via the indirect reflected path 112B travel a longer distance to the UE 102 than the downlink signals received by the UE 102 via the direct line of sight path 112A, the two downlink signals combine at the UE 102 with a phase delay due to their time differences in traveling to the UE 102. Depending on the wavelength of the carrier frequency used by the satellite 108 for the downlink signals and the amount of phase delay, the combined downlink signal received by the UE 102 can include constructive multi-path interference, resulting in a higher received signal level, or destructive multi-path interference, resulting in a lower received signal level. The amount of multi-path interference also depends on the reflectivity of the ground surface 120, with specular reflections causing a higher level of multi-path interference than diffuse reflections. The UE 102 also transmits uplink signals to the ground station 124 via the satellite 108, and the satellite 108 relays the uplink signals to the ground station 124 via the GS to SAT link 110. The uplink signals received at the satellite 108 will include both a direct line of sight path component and an indirect path component reflected from the ground surface 120, resulting in multi-path interference in the uplink signals received at the satellite 108 similar to that encountered by the UE 102 for downlink signals received from the satellite 108. The UE 102 can include multiple antennas positioned at different points of the UE 102, with each antenna receiving a different level of multi-path interference. The amount of multi-path interference also depends on i) an elevation 104 of the UE 102 above the reflecting ground surface 120, ii) an angle of incidence 116 and angle of reflection 118 of the downlink signals received via the indirect reflected path 112B, an iii) an orientation of the UE 102 relative to the reflecting ground surface 120 (e.g., in an upright, tilted, or flat orientation), and iv) an elevation angle (Θ) 114 and elevation 122 of the satellite 108 relative to the ground surface 120. An amount of multi-path interference received at each antenna of one or more antennas of the UE 102 can be algorithmically modeled and predicted using a two-ray model, one ray for the SAT to UE direct line of sight path 112A and one ray for the SAT to UE indirect reflected path 112B. The UE 102, in some embodiments, can include a real-time and/or an off-line calculated algorithmic model for the multi-path interference. The UE 102 can determine the UE elevation 104 above the ground surface 120 based on positional information from one or more sensors included in the UE 102, e.g., a barometer, a gyroscope, an accelerometer, and/or a global positioning system (GPS) module. A distance between antennas can be constant and pre-determined by the algorithmic model based on a hardware model type of the UE 102. A phase offset value for the phase shift difference between the SAT to UE direct line of sight path 112A and the SAT to UE indirect reflected path 112B can be calculated per Equation (1), where λ, represents the wavelength of the downlink (SAT to UE) carrier frequency used by the satellite 108 to communicate with the UE 102.

$$\text{Phase Offset} = [((\text{Direct Path Length}) - (\text{Indirect Path Length}))/\lambda * 360°] \quad (1)$$

The algorithmic model can determine calculate a predicted received signal level that combines the direct line of sight path 112A component and the phase offset indirect reflected path 112B component including periodicity of ripples in the received signal due to the multi-path interference. The algorithmic model can also calculate a reverse uplink ripple pattern from the calculated forward ripple pattern based on a wavelength conversion between the downlink and uplink carrier frequencies used by the satellite 108 and the UE 102. Predicted multi-path interference can be compared by the UE 102 to active measurements of receive signal levels, peak to trough fading levels, and fading ripple periodicity (e.g., peak to peak time differences). The UE 102 can determine whether to enter an adaptive mode of operation from a normal mode of operation, to exit the adaptive mode of operation to return to the normal mode of operation, to remain in the normal mode of operation, or to remain in the adaptive mode of operation based at least in part on the algorithmic model predictions and the measured received signal levels for downlink signals received from the satellite 108. While in the adaptive mode of operation, the UE 102 can also continue to measure and compare receive signal levels to a receive signal threshold to determine whether to operate in a high performance mode or in a low performance mode while in the adaptive mode of operation. In some embodiments, the receive signal threshold can represent a receive signal below which the UE 102 can be unable to decode reliably downlink signals received from the satellite 108.

Figure 2A:
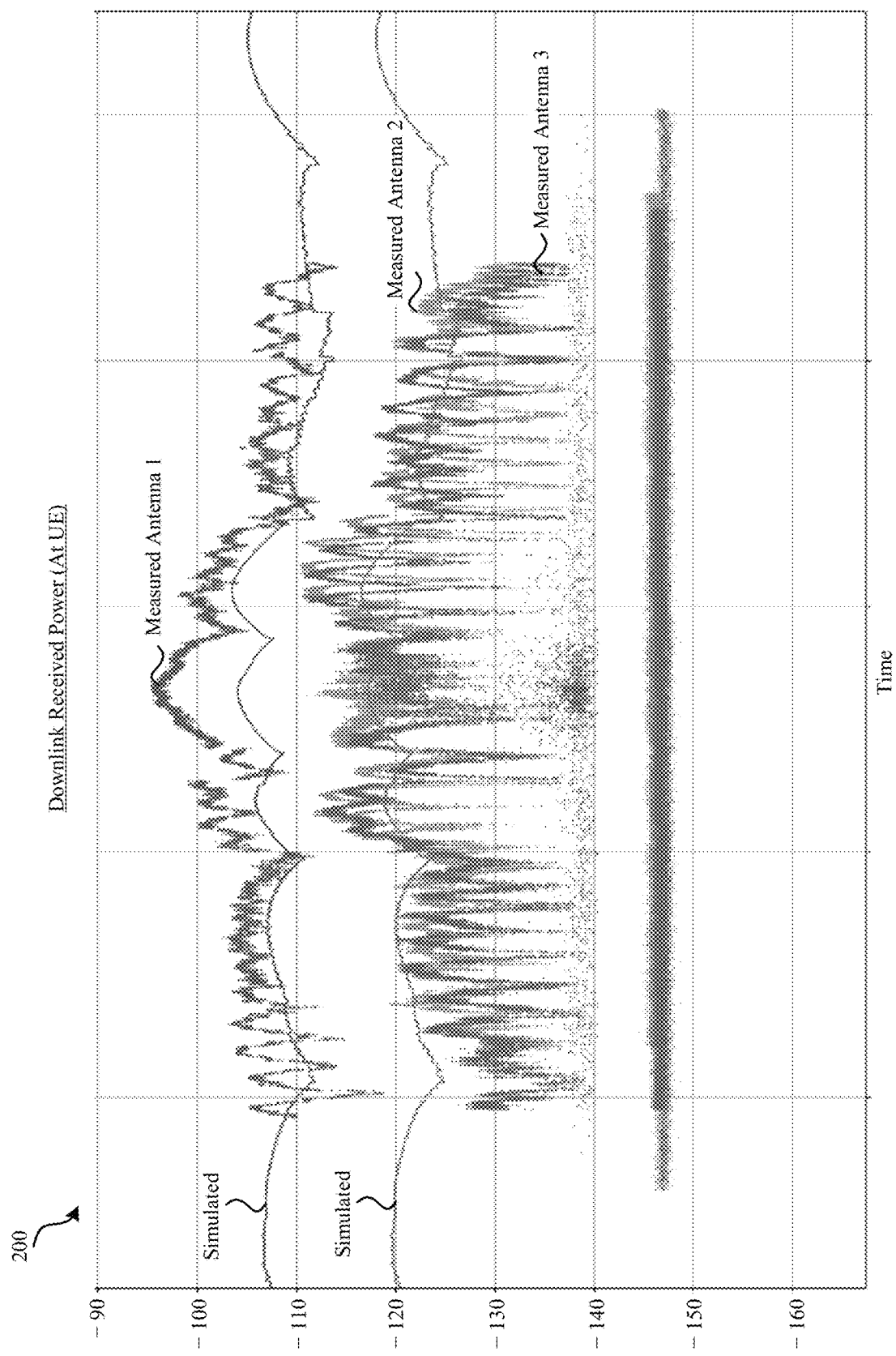
FIGS. 2A and 2B illustrate exemplary measurements of downlink signal power levels received by a wireless device from a satellite and uplink signal power levels received by a ground station from the wireless device via the satellite, in accordance with some embodiments.

FIG. 2A illustrates a diagram 200 of measurements of downlink received power (vertical axis in dBm) for signals received, from a satellite 108 during a single overhead pass, at several different antennas of a UE 102. Signals received via a first antenna are amplified at a higher level than signals received at a second antenna and a third antenna. All signals received by the antennas of the UE 101 exhibit variable signal level fading due to multi-path interference with ripples that vary with higher peak to lower trough levels with a repetitive periodicity.

Figure 2B:
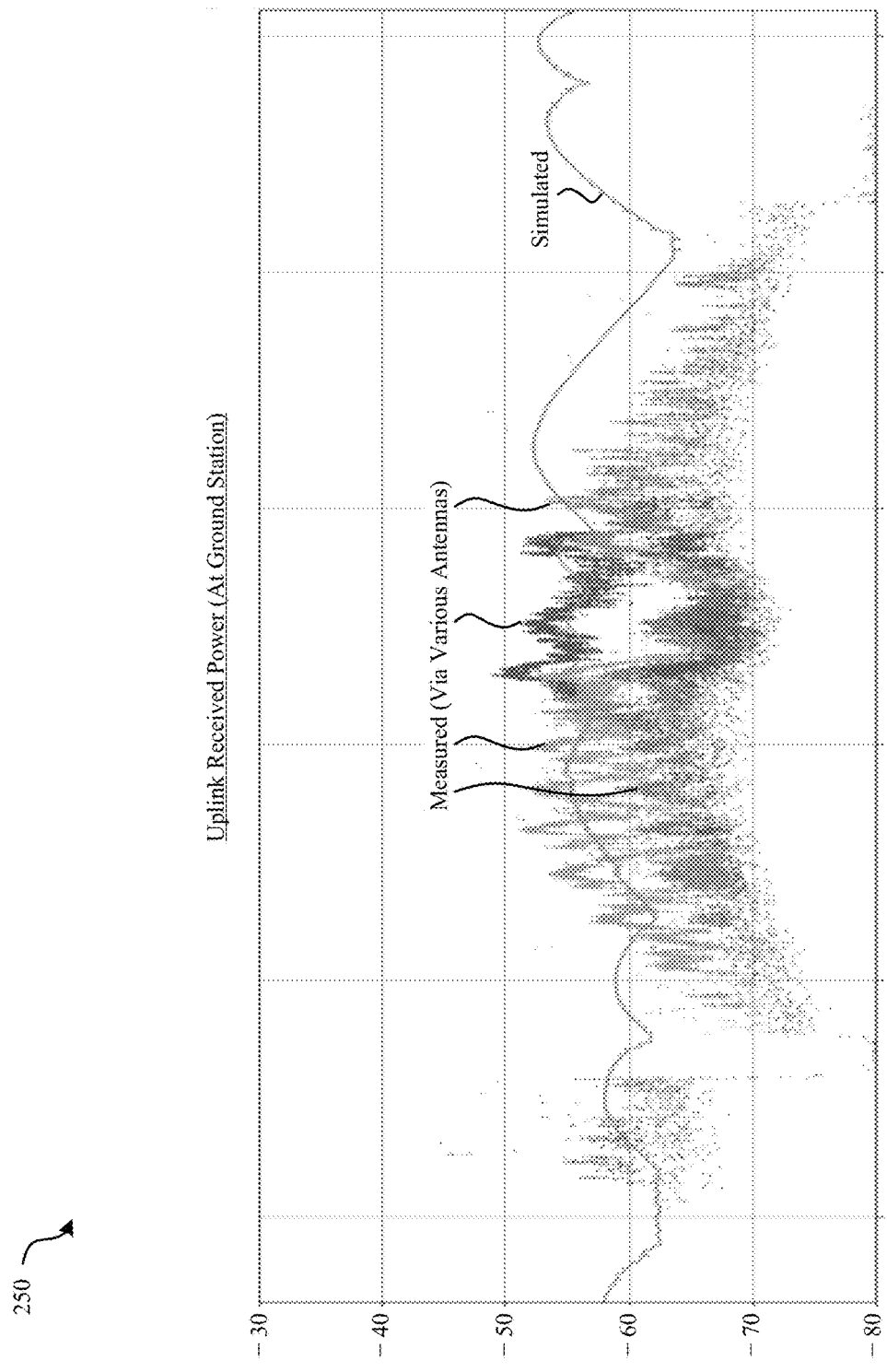

FIG. 2B illustrates a diagram 250 of measurements of uplink received power (vertical axis in dBm) for signals received at a ground station from multiple UEs 102 via the satellite 108 during a single overhead pass of the satellite 108. Again, the received signals exhibit multi-path interference fading ripples.

Figure 3:
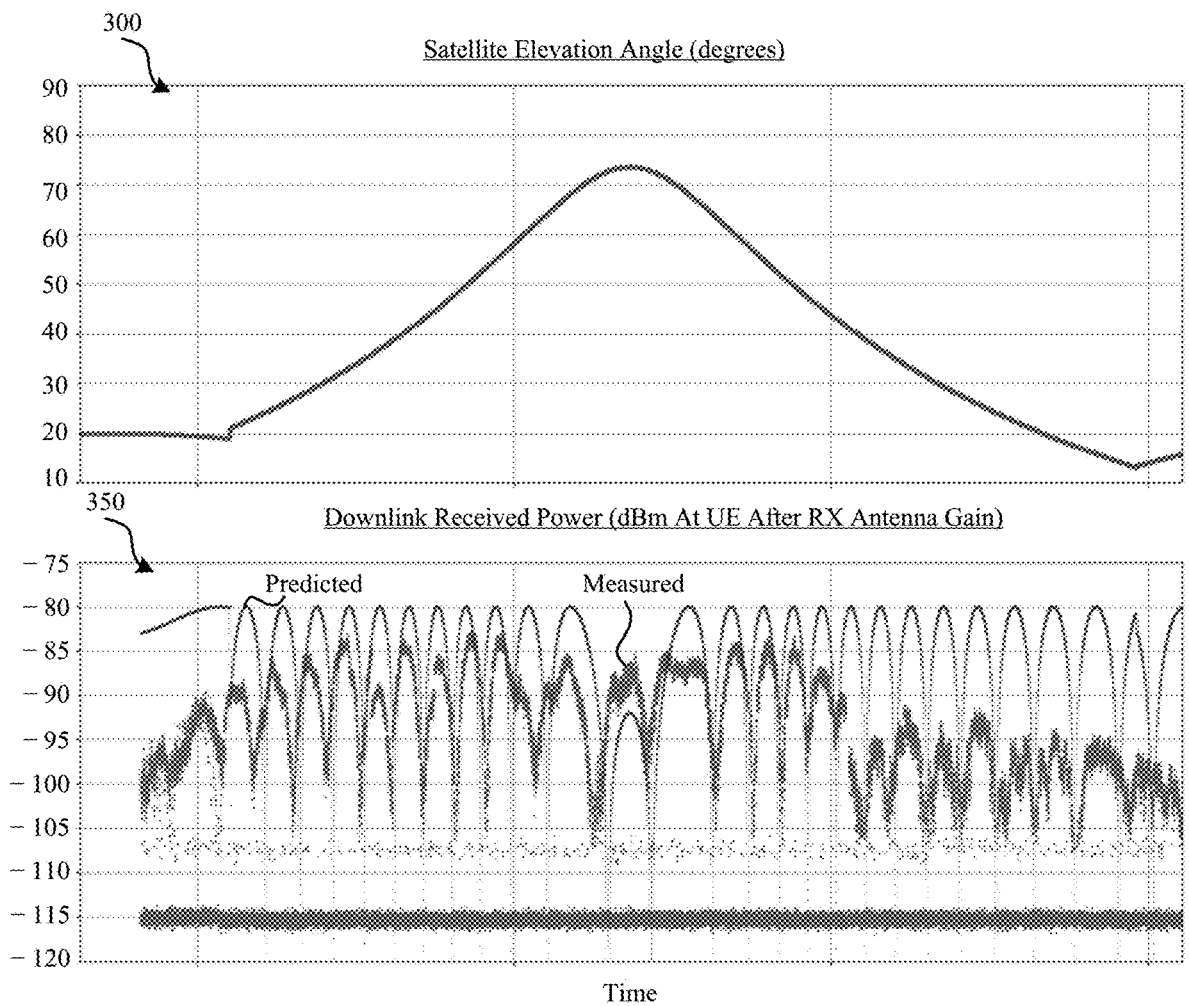
FIG. 3 illustrates an example of predicted and measured downlink received power levels at a wireless device during a single overhead transit of a satellite, in accordance with some embodiments.

FIG. 3 illustrates i) a diagram 300 of an elevation angle (measured in degrees) relative to a UE 102 on ground surface 120 during a single overhead pass of the satellite 108 and ii) a diagram 350 of predicted and measured downlink receive signal power levels (measured in dBm after receiver antenna gain at the UE 102) during the single overhead pass of the satellite 108. The predicted levels can be based on an algorithmic model as discussed herein. Both the predicted signal power levels and the measured power levels exhibit fading ripples that vary in level and periodicity during the single overhead pass of the satellite 108. Notably, the measured signal power levels exhibit rippling periodicity that matches well with the predicted signal power levels. As such, the algorithmic model can be used to predict multi-path interference characteristics in advance of and/or during measurements to determine whether to operate the UE 102 in an adaptive mode of operation with alternating high performance time periods and low performance time periods or in a normal mode of operation.

Figure 4:
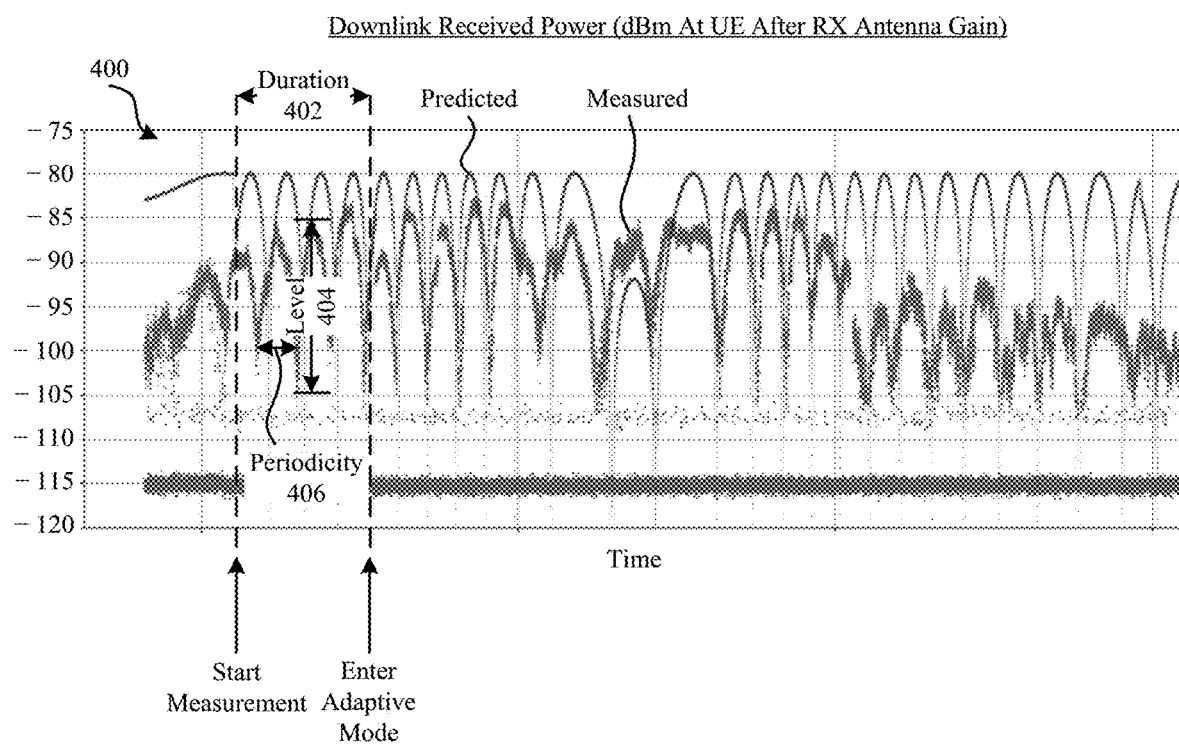
FIG. 4 illustrates an exemplary set of measurement criteria for entry to an adaptive operational mode for the wireless device, in accordance with some embodiments.

FIG. 4 illustrates a diagram 400 of the downlink received power (measured in dBm after receiver antenna gain at the UE 102) during a single overhead pass of the satellite 108 (as also shown in diagram 350 of FIG. 3) with additional annotations regarding receive signal characteristics that the UE 102 can predict and/or measure. The UE 102 can measure received signal levels, including a signal fade level 404 for each signal fade and a signal fade periodicity 406 during a total observation duration 402. The signal fade level 404 can be based on an aggregate difference between peak and lowest signal levels for a given signal fade (or set of signal fades). The signal fade periodicity 406 can be based on an aggregate periodicity in time for the receive signal to reach successive peak levels for a pair of signal fades (or averaged over a set of multiple successive signal fades). The predicted received signal power level can be based on satellite 108 characteristics, e.g., satellite elevation 122, satellite elevation angle 114, and on UE 102 characteristics, e.g., UE elevation 104, UE position, UE length 106, antenna positions within the UE 102. The UE 102 can determine whether to enter or exit an adaptive mode of operation based on measurements of received signal power in combination with predicted received signal characteristics over a duration time interval 402. When measurements of the received signal power satisfy at least one fading criteria, the UE 102 can enter the adaptive mode of operation. In some embodiments, the UE 102 can enter the adaptive mode of operation when multiple fading criteria are satisfied. In some embodiments, the measurements of the received signal power will satisfy the at least one fading criteria when i) signal fades are sufficiently large, e.g., the signal fade level 404 equals or exceeds a fading level threshold, and/or ii) signal fades occur sufficiently rapidly, e.g., the signal fading periodicity equals or falls below a fading periodicity threshold over a measurement duration time interval 402 that equals or exceeds a duration threshold. In some embodiments, the UE 102 can exit the adaptive mode of operation when the at least one fading criteria are all not satisfied, e.g., when i) signal fades are sufficiently small, e.g., the signal fade level 404 does not equal or exceed the fading level threshold, and/or ii) signal fades occur sufficiently slowly, e.g., the signal fading periodicity exceeds the fading periodicity threshold over a measurement duration time interval 402 of at least the duration threshold (or a second duration threshold for exiting the adaptive mode). In some embodiments, the UE 102 can exit the adaptive mode of operation when multiple fading criteria are not satisfied. While in the adaptive mode, the UE 102 can alternate between high performance time periods and low performance time periods. In some embodiments, the UE 102 determines the high performance time periods and low performance time periods based on a comparison of predicted signal power levels and/or measured signal power levels to a receive signal threshold (not shown in FIG. 4). Exemplary values for thresholds include 8+ dB for the fading level threshold, 120+ seconds for the duration threshold, 30+ seconds for the fading periodicity threshold, and −92 dBm for the receive signal threshold.

Applicable threshold values can be determined offline and/or dynamically in real-time using algorithmic models for multi-path interference, such as a two-ray model as discussed herein, and the threshold values used by the UE 102 can be fixed or variable over time.

Figure 5A:
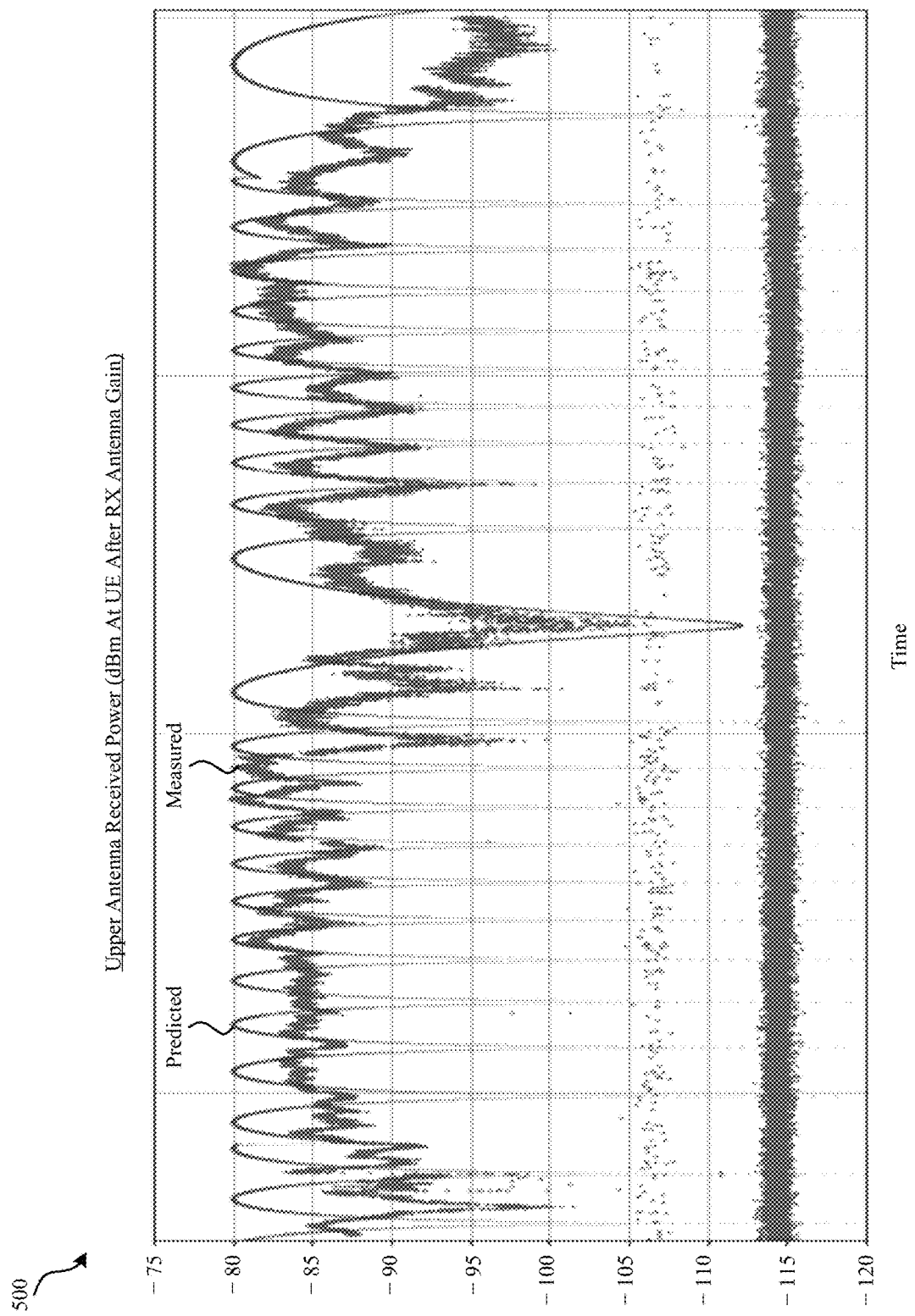
FIGS. 5A and 5B illustrates additional examples of predicted and measured downlink received power levels at different antennas of a wireless device, in accordance with some embodiments.
Figure 5B:
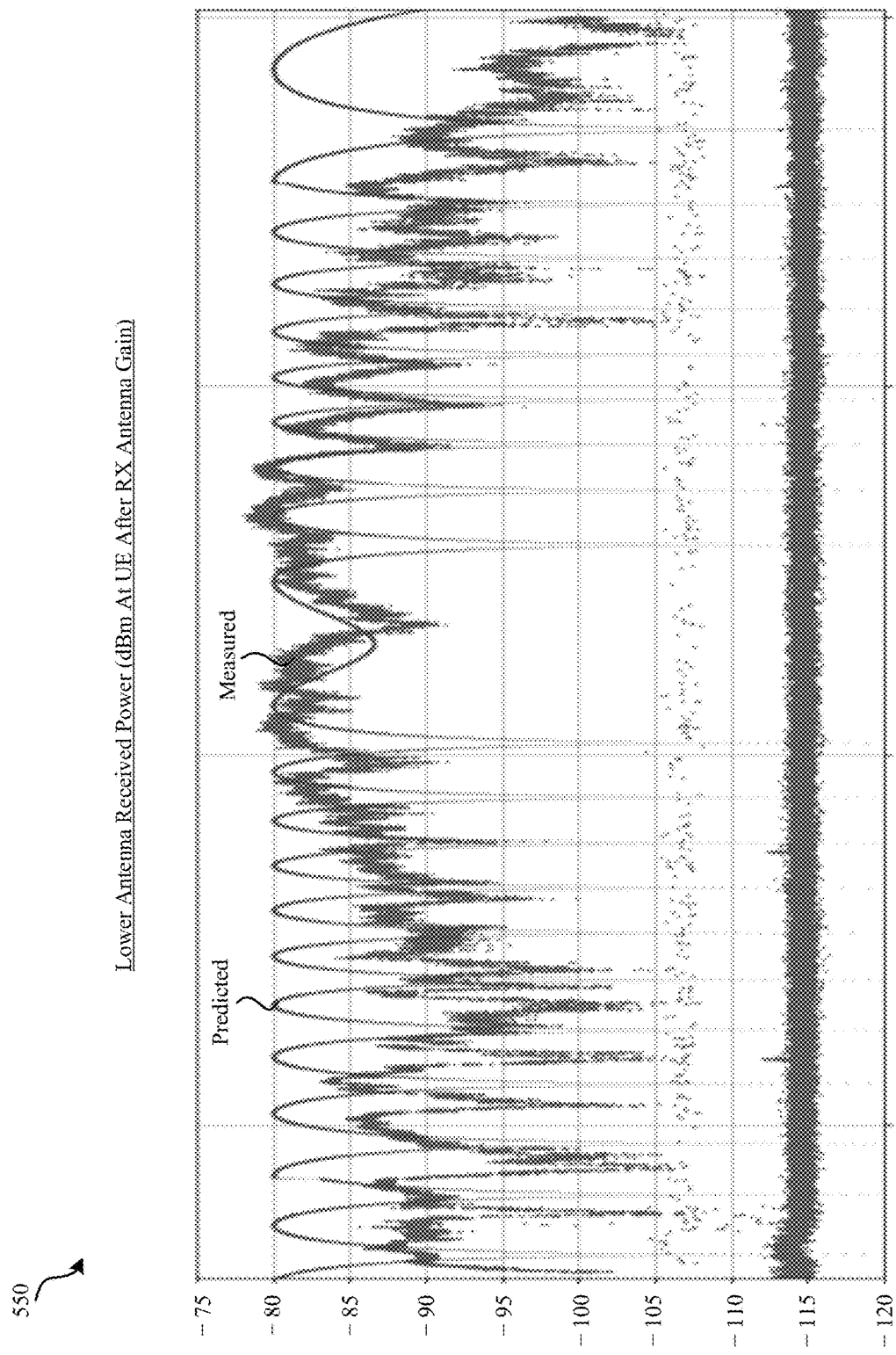

FIGS. 5A and 5B illustrate diagrams 500 and 550 of predicted and measured received signal power levels at two different antennas of a UE 102. Each antenna can be positioned at a different point on the UE 102, and an orientation of the UE 102 with respect to a surrounding reflective ground surface 120 can impact the amount of constructive and destructive multi-path interference resulting from combining the direct line of sight path 112A component and the indirect reflected path 112B component of the received signal. In addition, each antenna can have different physical gains applied and/or different receive characteristics. An algorithmic model for prediction of the received signal can account for one or more of these different characteristics. In some embodiments, the algorithmic model can determine an elevation 104 and positional orientation of the UE 102 above the reflective ground surface 120 using one or more sensors in the UE 102, e.g., a barometer, a gyroscope, an accelerometer, a GPS unit. The algorithmic model can use the determined elevation 104 and positional information along with a known fixed antenna position on the UE 102 to predict a received signal level at the antenna of the UE 102. A phase offset between the direct line of sight path 112A component and indirect reflected path 112B component of the received signal can be calculated and characteristics of resulting multi-path interference (and predicted received signal level), e.g., fading level, fading periodicity, etc., can be determined by the UE 102 for the downlink received signal. Uplink received signal fading patterns can also be determined by the UE 102 based on a wavelength conversion between downlink and uplink carrier frequencies used by the satellite 108 and the UE 102. In some embodiments, the algorithmic model in the UE 102 accounts for a type of terrain (e.g., water, ground, concrete, tarmac, sand, grass, woodland, etc.) of the surrounding reflective ground surface 120, e.g., based on GPS coordinate information and pre-stored (or network stored and UE accessible) terrain mapping information to determine amount of reflectivity of the ground surface 120 in predicting the received signal multi-path interference characteristics. The UE 102 can update predictions from the algorithmic model as position and orientation of the UE 102 changes. The UE 102 can continuously monitor the received signal level and compare the measured received signal characteristics and the predicted received signal level to at least one threshold criteria to determine whether to remain in a normal mode of operation, enter an adaptive mode of operation, remain in an adaptive mode of operation, or exit an adaptive mode of operation returning to a normal mode of operation. The UE 102 can adapt threshold criteria values during operation as well.

Figure 6:
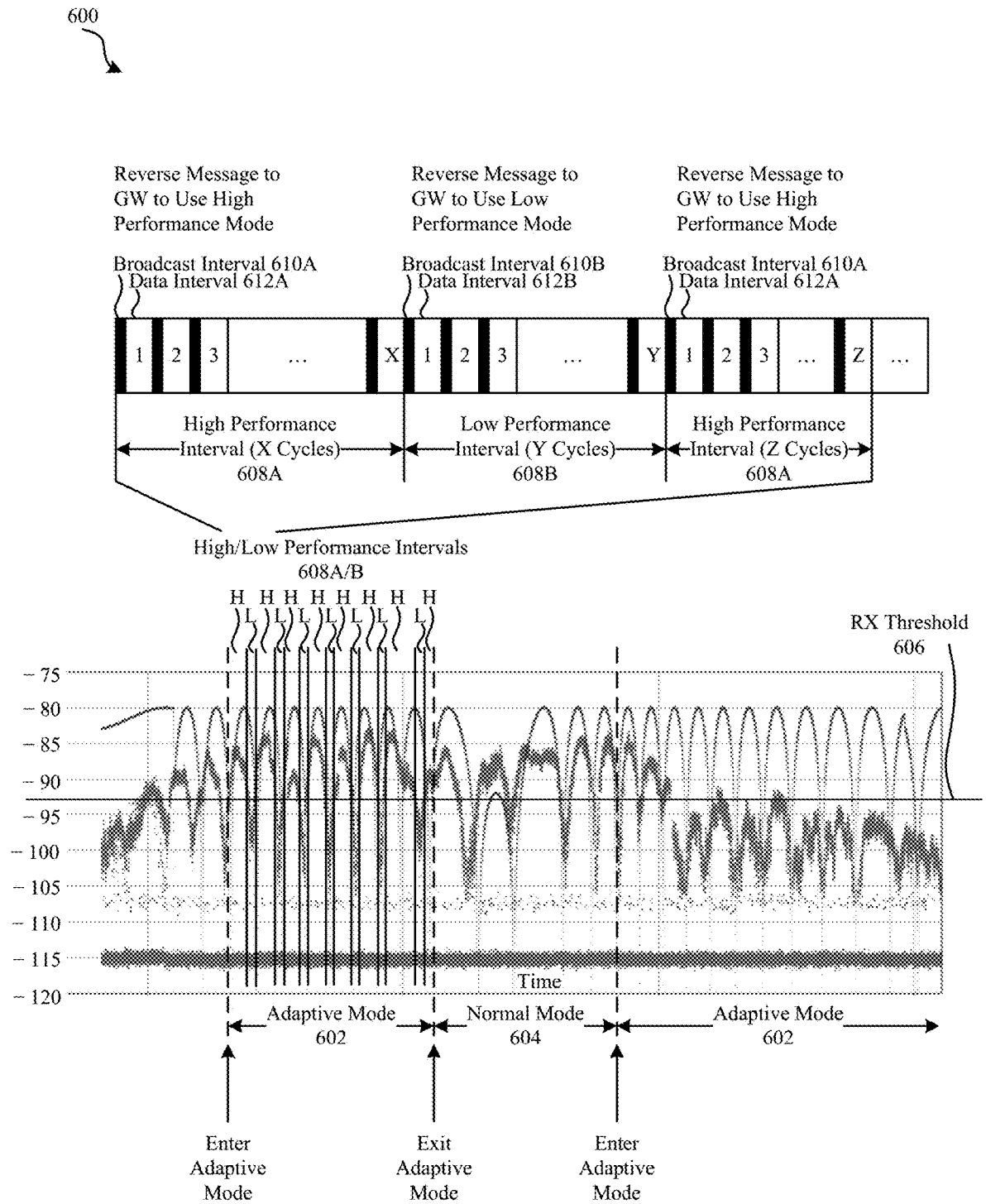
FIG. 6 illustrates an example of adaptive mode behavior by a wireless device to mitigate specular reflections, in accordance with some embodiments.

FIG. 6 illustrates a diagram 600 of an exemplary adaptive mode 602 of operation by a UE 102 to mitigate multi-path interference caused by specular reflections of satellite signals received by the UE 102. The UE 102 can measure received signal characteristics, e.g., signal fade level 404 and signal fade periodicity 406, over a time duration 402 and compare the measurements to a set of fading criteria to determine whether to enter an adaptive mode 602 of operation. While operating in the adaptive mode 602, the UE 102 can alternate between using a high performance mode during high performance mode time intervals 608A and a low performance mode during low performance mode time intervals 608B. Each high performance mode time interval 608A can include multiple data cycles, where each data cycle begins with a broadcast interval 610A, during which the UE 102 listens for broadcast information from the satellite 108 to determine whether the UE 102 is scheduled to transmit and/or receive data during a data interval 612A that immediately follows the broadcast interval 610A. The satellite 108 informs the UE 102 in each broadcast interval 610A/B whether forward downlink data is scheduled for the UE 102 and/or whether reverse uplink data is scheduled for the UE 102. During the first data interval 612A of each high performance mode interval 608, while in the adaptive mode 602 of operation, the UE 102 sends a reverse uplink message to the ground station 124 via the satellite 108 informing the ground station 124 that the UE 102 is operating in the high performance mode. The UE 102 continues to operate in the high performance mode for multiple cycles of the high performance mode time interval 608A until entering a subsequent low performance mode time interval 608B. The message sent in the first data interval 612A of the first cycle of the high performance mode time interval 608A provides an indication to the ground station 124 to schedule and/or format data transmissions to the UE 102 appropriately for operation in the high performance mode. Similarly, during the first data interval 612B of each high performance mode interval 608, while in the adaptive mode 602 of operation, the UE 102 sends a reverse uplink message to the ground station 124 via the satellite 108 informing the ground station 124 that the UE 102 is operating in the low performance mode. The UE 102 continues to operate in the low performance mode for multiple cycles of the low performance mode time interval 608B until entering a subsequent high performance mode time interval 608B. The message sent in the first data interval 612A of the first cycle of the high performance mode time interval 608A provides an indication to the ground station 124 to schedule (or refrain from scheduling) and/or format data transmissions to the UE 102 appropriately for operation in the low performance mode. The UE 102 alternates between high performance mode time intervals 608A and low performance mode time intervals 608B while in the adaptive mode 602 and informs the ground station at the beginning of each of the high (or low) performance mode time intervals 608A (or 608B) of the mode of operation of the UE 102. The ground station can adjust communication parameters for downlink data and/or uplink data to improve performance of the UE 102 while in the adaptive mode 602. In some embodiments, upon entering the adaptive mode 602, the UE 102 informs the ground station 124 of the change of operational mode of the UE 102. In some embodiments, upon exiting the adaptive mode 602 and returning to the normal mode 604, the UE 102 informs the ground station 124 of the change of operational mode of the UE 102. In some embodiments, the UE 102 determines the alternating high performance mode time intervals 608A and low performance mode time intervals 608B based on predicted receive signal levels, e.g., comparing the predicted receive signal levels to a receive signal threshold 606. In some embodiments, the UE 102 determines the alternating high performance mode time intervals 608A and low performance mode time intervals 608B based on measured receive signal level characteristics. The number of cycles included in a high performance mode time interval 608A or in a low performance mode time interval 608B can vary throughout the adaptive mode 602 of operation. The width of a high performance mode time interval 608A or a low performance mode time interval 608B can be based at least in part on fading levels and fading periodicity as well as the receive signal threshold 606. In some embodiments, the receive signal threshold 606 represents a level below which the UE 102 cannot reliably decode downlink signals received from the satellite 108. The ground station can vary data characteristics and data scheduling to concentrate data throughput during high performance mode time intervals 608A, during which data reception by the UE 102 from the satellite 108 is expected to be more reliable, and reduce data throughput and/or scheduling during low performance mode time intervals 608B, during which data reception by the UE 102 from the satellite 108 is expected to be less reliable. By predicting multi-path fading characteristics for an adaptive mode 602 time period and signaling alternating high performance mode time intervals 608A and low performance mode time intervals 608B to the satellite 108, the UE 102 can more efficiently use communication resources. In some embodiments, data characteristics and scheduling during high performance mode time intervals 608A can be comparable to those used during a normal mode 604 of operation. In some embodiments, data characteristics and scheduling during low performance mode time intervals 608B can vary from those used during a normal mode 604 of operation.

FIG. 7 illustrates a table 700 of different adaptive properties that can be applied by the ground station 124 (or the UE 102) for scheduling and/or formatting downlink data transmissions (or uplink data transmissions) for a UE 102 for the high performance mode time periods (cycles) 608A and the low performance mode time periods (cycles) 608B, while the UE 102 operates in the adaptive mode 602 of operation. Table 700 lists multiple options for different adaptive properties that can be adjusted alone or in combination by the ground station 124 and/or the UE 102. During a high performance mode time period 608A, the ground station 124 and/or the UE 102 can schedule transmit and/or receive data normally, while during a low performance mode time period 608B, the ground station 124 and/or the UE 102 can refrain from scheduling transmit and/or receive data. During a high performance mode time period 608A, the ground station 124 and/or the UE 102 can schedule transmit and/or receive data with a high dynamic receive (DRX) characteristic, e.g., use more cycles for data, while during a low performance mode time period 608B, the ground station 124 and/or the UE 102 can schedule transmit and/or receive data with a low DRX characteristic, e.g., use fewer cycles for data. During a high performance mode time period 608A, the ground station 124 and/or the UE 102 can use higher modulation (larger signal constellations) for transmitted data, while during a low performance mode time period 608B, the ground station 124 and/or the UE 102 can use lower modulation (smaller signal constellation) for transmitted data. During a high performance mode time period 608A, the UE 102 can operate in a normal power consumption mode, while during a low performance mode time period 608B, the UE 102 can operate in a reduced power consumption mode. During a high performance mode time period 608A, the ground station 124 and/or the UE 102 can schedule transmit and/or receive data having a higher priority, while during a low performance mode time period 608B, the ground station 124 and/or the UE 102 can schedule transmit and/or receive data having a lower priority. Examples of higher priority data include signaling data, emergency services data, and voice application data, while examples of lower priority data include TCP/UDP based application data, and video application data. During a high performance mode time period 608A, the ground station 124 and/or the UE 102 can schedule transmit and/or receive data having higher quality of service (QoS) requirements, while during a low performance mode time period 608B, the ground station 124 and/or the UE 102 can schedule transmit and/or receive data having lower QoS requirements.

Figure 8:
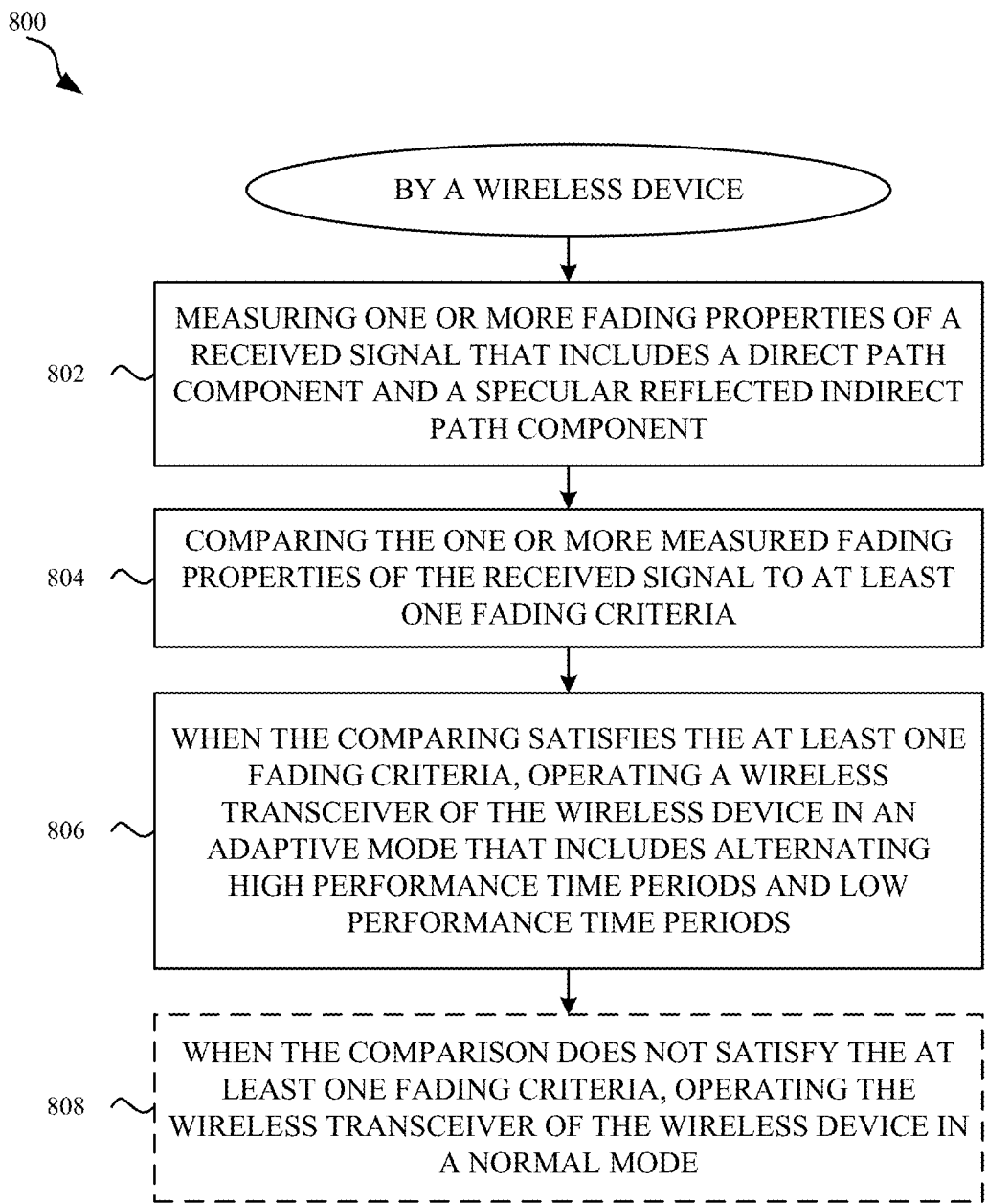
FIG. 8 illustrates an exemplary method performed by a wireless device to adapt operating modes to mitigate specular reflections, in accordance with some embodiments.

FIG. 8 illustrates a flowchart 800 of an exemplary method performed by a wireless device, e.g., UE 102, to mitigate effects of multi-path interference caused by specular reflections of signals received from a satellite 108. At 802, the wireless device measures one or more fading properties of a received signal that includes a direct path component, e.g., via a SAT to UE direct line of sight path 112A, and a specular reflected indirect path component, e.g., via a SAT to UE indirect reflected path 112B. At 804, the wireless device compares the one or more measured fading properties of the received signal to at least one fading criteria. At 806, when the comparison satisfies the at least one fading criteria, the wireless device operates a wireless transceiver contained therein in an adaptive mode or operation that includes alternating high performance mode time periods and low performance mode time periods. In some embodiments, optionally, at 808, when the comparison does not satisfy the at last one fading criteria, the wireless device operates the wireless transceiver in a normal mode of operation In some embodiments, the comparison satisfies the at least one fading criteria when: i) a measurement duration satisfies a duration threshold, and ii) a fading level satisfies a fading level threshold and a fading periodicity satisfies a fading periodicity threshold. In some embodiments, the fading level fading level satisfies the fading level threshold when the difference between a peak level and a lowest level for two or more fades of the measurement duration equals or exceeds the fading level threshold. In some embodiments, the fading level fading level satisfies the fading level threshold when the difference between a peak level and a lowest level for all fades of the measurement duration equals or exceeds the fading level threshold. In some embodiments, the fading periodicity satisfies the fading periodicity threshold when a time period between two or more successive fades of the measurement duration equals or falls below the fading periodicity threshold. In some embodiments, the fading periodicity satisfies the fading periodicity threshold when time periods between all pairs of successive fades of the measurement duration equal or fall below the fading periodicity threshold. In some embodiments, the comparison does not satisfy the fading criteria when: i) the measurement duration does not satisfy the duration threshold, ii) the fading level does not satisfy the fading level threshold, or iii) the fading periodicity does not satisfy the fading periodicity threshold. In some embodiments, the fading level does not satisfy the fading level threshold when the difference between the peak level and the lowest level for two or more fades of the measurement duration does not exceed the fading level threshold. In some embodiments, the fading level does not satisfy the fading level threshold when the difference between the peak level and the lowest level for all fades of the measurement duration does not exceed the fading level threshold. In some embodiments, the fading periodicity does not satisfy the fading periodicity threshold when the time period between two or more successive fades of the measurement duration exceeds the fading periodicity threshold. In some embodiments, the fading periodicity does not satisfy the fading periodicity threshold when the time period between all successive fades of the measurement duration exceeds the fading periodicity threshold. In some embodiments, the method further includes when the comparison partially satisfies the at least one fading criteria and partially does not satisfy the at last one fading criteria, continuing to operate the wireless transceiver in a currently configured normal mode or adaptive mode. In some embodiments, the method further includes maintaining the wireless device in a currently configured mode when the at least one fading criteria is not satisfied. In some embodiments, the method further includes the wireless device determining respective time durations of the high performance time periods and the low performance time periods based at least in part on a comparison of a predicted receive signal level from the satellite to a receive signal threshold. In some embodiments, the method further includes the wireless device transmitting to a ground station through an uplink communication link via the satellite during the first data interval of the first cycle of a high performance time period, a first message to indicate operation of the wireless device in a high performance mode during the high performance time period. In some embodiments, the method further includes the wireless device transmitting to the ground station through the uplink communication link via the satellite during the first data interval of the first cycle of a low performance time period, a second message to indicate operation of the wireless device in a low performance mode during the low performance time period. In some embodiments, downlink data transmission to the wireless device and/or uplink data transmission from the wireless device is allowed during the high performance time periods and disallowed during the low performance time periods. In some embodiments, a downlink data transmission quantity and/or rate to the wireless device and/or uplink data transmission quantity and/or rate from the wireless device is higher during one or more high performance time periods than during one or more low performance time periods. In some embodiments, downlink data transmission to and/or uplink data transmission from the wireless device uses higher modulation during one or more high performance time periods than during one or more low performance time periods. In some embodiments, downlink data or uplink data includes higher priority data during at least one high performance time period than during at least one low performance time period. In some embodiments, downlink data or uplink data includes higher priority data during at least one high performance time period and lower performance data during at least one low performance time period. In some embodiments, downlink data or uplink data includes higher quality of service (QoS) data during at least one high performance time period than during at least one low performance time period. In some embodiments, downlink data or uplink data includes higher quality of service (QoS) data during at least one high performance time period and lower QoS data during at least one low performance time period. In some embodiments, the ground station i) schedules downlink data and/or uplink data transmission for the wireless device during at least one high performance time period, and ii) refrains from scheduling downlink data and/or uplink data transmission for the wireless device during at least one low performance time period. In some embodiments, the ground station i) schedules more downlink data and/or uplink data transmission for the wireless device during one or more high performance time periods, and ii) schedules less downlink data and/or uplink data transmission for the wireless device during one or more low performance time periods. In some embodiments, the ground station i) schedules downlink data and/or uplink data transmission with higher modulation for the wireless device during one or more high performance time periods, and ii) schedules downlink data and/or uplink data transmission with lower modulation for the wireless device during one or more low performance time periods. In some embodiments, the ground station i) schedules higher priority downlink data and/or uplink data transmission for the wireless device during one or more high performance time periods, and ii) schedules lower priority downlink data and/or uplink data transmission for the wireless device during one or more low performance time periods. In some embodiments, the ground station i) schedules higher quality of service (QoS) downlink data and/or uplink data transmission for the wireless device during one or more high performance time periods, and ii) schedules lower QoS downlink data and/or uplink data transmission for the wireless device during one or more low performance time periods. In some embodiments, the wireless device i) operates in a normal power consumption mode during one or more high performance time periods, and ii) operates in a reduced power consumption mode during one or more low performance time periods.

In some embodiments, a wireless device includes an antenna communicatively coupled to processing circuitry that includes one or more processors and a memory storing instructions that, when executed by the one or more processors, cause the wireless device to perform actions that include: i) measuring one or more fading properties of a signal received from a satellite, the signal including a direct path component and a specular reflected indirect path component, ii) comparing the one or more measured fading properties of the signal to at least one fading criteria, and iii) when the comparing satisfies the at least one fading criteria, configuring a wireless transceiver of the wireless device to operate in an adaptive mode that includes alternating high performance time periods and low performance time periods. In some embodiments, when the comparing does not satisfy the at least one fading criteria, the wireless device configures the wireless transceiver of the wireless device to operate in a normal mode. In some embodiments, the actions further include determining, by the wireless device, a first time duration associated with the high performance time periods and a second time duration associated with the low performance time periods based at least in part on a comparison of a predicted receive signal level from the satellite to a receive signal threshold. In some embodiments, the actions further include i) transmitting, by the wireless device, e.g., to a ground station through an uplink communication link via the satellite, during the first data interval of the first cycle of a high performance time period, a first message indicating operation of the wireless device in a high performance mode during the high performance time period, and ii) transmitting, by the wireless device, e.g., to the ground station through the uplink communication link via the satellite, during the first data interval of the first cycle of a low performance time period, a second message indicating operation of the wireless device in a low performance mode during the low performance time period. In some embodiments, the actions further include, determining whether to maintain the wireless transceiver in a currently configured mode based on the comparing.

In some embodiments, an apparatus configured for operation in a wireless device includes processing circuitry including one or more processors and a memory storing instructions that, when executed by the one or more processors, cause the wireless device to perform actions that include: i) measuring one or more fading properties of a signal received from a satellite, the signal including a direct path component and a specular reflected indirect path component, ii) comparing the one or more measured fading properties of the signal to at least one fading criteria, and iii) when the comparing satisfies the at least one fading criteria, operating in an adaptive mode that includes alternating high performance time periods and low performance time periods. Operating in the adaptive mode can include controlling a wireless transceiver as described herein to adapt operation to use alternating high performance time periods and low performance time periods. In some embodiments, the actions further include when the comparing does not satisfy the at least one fading criteria, operating, e.g., controlling a wireless transceiver of the wireless device, in a normal mode. In some embodiments, the actions further include, determining whether to maintain a currently configured operating mode, e.g., of the wireless transceiver, based on the comparing.

Figure 9:
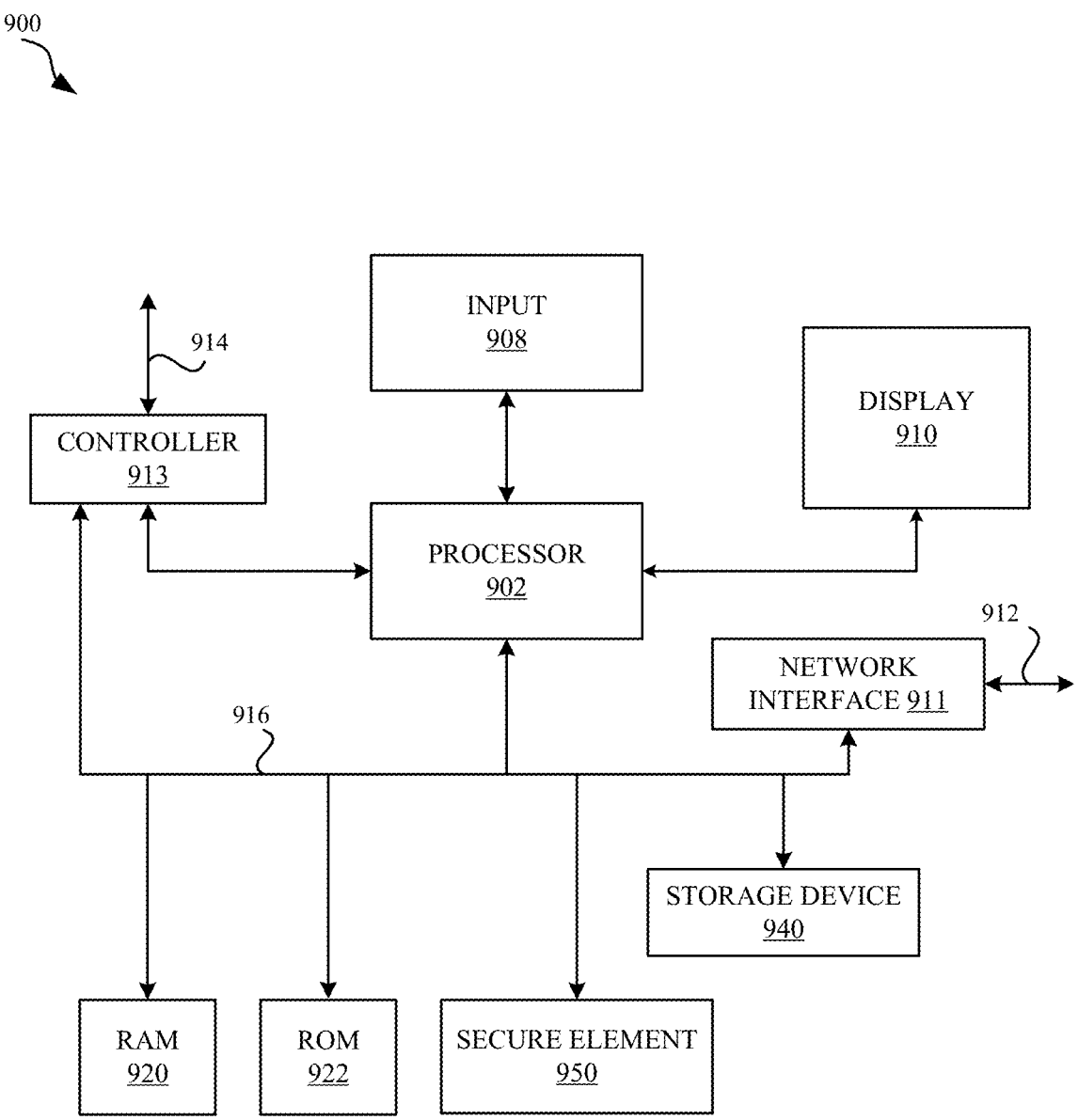
FIG. 9 illustrates an exemplary apparatus for implementation of embodiments disclosed herein, in accordance with some embodiments.

FIG. 9 illustrates a detailed view of a representative computing device 900 that can be used to implement various methods described herein, according to some embodiments. In particular, the detailed view illustrates various components that can be included in the UE 102. As shown in FIG. 9, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data, etc. Still further, the computing device 900 can include a display 910 that can be controlled by the processor 902 to display information to the user. A data bus 916 can facilitate data transfer between at least a storage device 940, the processor 902, and a controller 913. The controller 913 can be used to interface with and control different equipment through an equipment control bus 914. The computing device 900 can also include a network/bus interface 911 that communicatively couples to a data link 912. In the case of a wireless connection, the network/bus interface 911 can include a wireless transceiver.

The computing device 900 also includes a storage device 940, which can include a single disk or a plurality of disks (e.g., hard drives), and includes a storage management module that manages one or more partitions within the storage device 940. In some embodiments, storage device 940 can include flash memory, semiconductor (solid state) memory or the like. The computing device 900 can also include a Random Access Memory (RAM) 920 and a Read-Only Memory (ROM) 922. The ROM 922 can store programs, utilities or processes to be executed in a non-volatile manner. The RAM 920 can provide volatile data storage, and stores instructions related to the operation of the computing device 900. The computing device 900 can further include a secure element (SE) 950, which can represent secure storage for cellular wireless access control clients, such as a subscriber identity module (SIM) or electronic SIM, for use by the wireless device 102 to establish a wireless wide area network, or to access a satellite communication network.

Wireless Terminology

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or fifth generation (5G) or other present or future next generation (NG) developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device can be configured to prefer attachment to LTE networks offering faster data rate throughput, as compared to other 3G legacy networks offering lower data rate throughputs. For instance, in some implementations, a multi-mode wireless device may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for mitigating specular reflections, the method comprising:
   by a wireless device:
   measuring one or more fading properties of a signal received from a satellite, the signal including a direct path component and a specular reflected indirect path component;
   comparing the one or more measured fading properties of the signal to at least one fading criteria; and
   when the comparing satisfies the at least one fading criteria, configuring a wireless transceiver of the wireless device to operate in an adaptive mode that comprises alternating high performance time periods and low performance time periods.

2. The method of claim 1, wherein the at least one fading criteria comprises:
   a measurement duration;
   a fading level; and
   a fading periodicity.

3. The method of claim 2, wherein the comparing satisfies the at least one fading criteria when:
   a measurement duration satisfies a duration threshold; and
   a fading level satisfies a fading level threshold and a fading periodicity satisfies a fading periodicity threshold.

4. The method of claim 3, wherein the fading level satisfies the fading level threshold when a difference between a peak level and a lowest level for two or more fades of the measurement duration equals or exceeds the fading level threshold.

5. The method of claim 3, wherein the fading periodicity satisfies the fading periodicity threshold when a time period between two or more successive fades of the measurement duration equals or falls below the fading periodicity threshold.

6. The method of claim 1, further comprising:
   by the wireless device:
   when the comparing does not satisfy the at least one fading criteria, configuring the wireless transceiver of the wireless device to operate in a normal mode.

7. The method of claim 1, further comprising:
   maintaining the wireless device in a currently configured mode when the at least one fading criteria is not satisfied.

8. The method of claim 1, further comprising:
   determining, by the wireless device, respective time durations of the high performance time periods and the low performance time periods based at least in part on a comparison of a predicted receive signal level from the satellite to a receive signal threshold.

9. The method of claim 1, further comprising:
   transmitting, by the wireless device to a ground station through an uplink communication link via the satellite during a first data interval of a first cycle of a high performance time period, a first message to indicate operation of the wireless device in a high performance mode during the high performance time period.

10. The method of claim 1, further comprising:
    transmitting, by the wireless device to a ground station through an uplink communication link via the satellite during a first data interval of a first cycle of a low performance time period, a second message to indicate operation of the wireless device in a low performance mode during the low performance time period.

11. The method of claim 1, wherein:
    downlink data transmission to the wireless device and/or uplink data transmission from the wireless device is allowed during the high performance time periods and disallowed during the low performance time periods.

12. The method of claim 1, wherein a downlink data transmission quantity and/or rate to the wireless device and/or uplink data transmission quantity and/or rate from the wireless device is higher during the high performance time periods than during the low performance time periods.

13. The method of claim 1, wherein downlink data transmission to and/or uplink data transmission from the wireless device uses higher modulation during one or more of the high performance time periods than during one or more of the low performance time periods.

14. The method of claim 1, wherein downlink data or uplink data comprises higher priority data during at least one high performance time period than during at least one low performance time period.

15. The method of claim 1, wherein downlink data or uplink data comprises higher quality of service (QoS) data during at least one high performance time period than during at least one low performance time period.

16. The method of claim 1, wherein the wireless device:
    operates in a normal power consumption mode during at least one high performance time period; and
    operates in a reduced power consumption mode during at least one low performance time period.

17. A wireless device comprising:
    an antenna; and
    processing circuitry communicatively coupled to the antenna and comprising one or more processors and a memory storing instructions that, when executed by the one or more processors, cause the wireless device to perform actions that include:
    measuring one or more fading properties of a signal received from a satellite, the signal including a direct path component and a specular reflected indirect path component;
    comparing the one or more measured fading properties of the signal to at least one fading criteria; and
    when the comparing satisfies the at least one fading criteria, configuring a wireless transceiver of the wireless device to operate in an adaptive mode that comprises alternating high performance time periods and low performance time periods.

18. The wireless device of claim 17, wherein the actions further include:
    determining, by the wireless device, a first time duration associated with the high performance time periods and a second time duration associated with the low performance time periods based at least in part on a comparison of a predicted receive signal level from the satellite to a receive signal threshold.

19. The wireless device of claim 17, wherein the actions further include:
- transmitting, by the wireless device, during a first data interval of a first cycle of a high performance time period, a first message indicating operation of the wireless device in a high performance mode during the high performance time period; and
- transmitting, by the wireless device, during a first data interval of a first cycle of a low performance time period, a second message indicating operation of the wireless device in a low performance mode during the low performance time period.

20. An apparatus configured for operation in a wireless device, the apparatus comprising processing circuitry comprising one or more processors and a memory storing instructions that, when executed by the one or more processors, cause the wireless device to perform actions that include:
- measuring one or more fading properties of a signal received from a satellite, the signal including a direct path component and a specular reflected indirect path component;
- comparing the one or more measured fading properties of the signal to at least one fading criteria; and
- when the comparing satisfies the at least one fading criteria, operating in an adaptive mode that comprises alternating high performance time periods and low performance time periods.

* * * * *